US008231105B2

(12) United States Patent
Ricco et al.

(10) Patent No.: US 8,231,105 B2

(45) **Date of Patent: *Jul. 31, 2012**

(54) ADJUSTABLE METERING SERVOVALVE FOR A FUEL INJECTOR, AND RELATIVE ADJUSTMENT METHOD

(75) Inventors: Mario Ricco, Casamassima (IT); Adriano Gorgoglione, Valenzano (IT); Sisto Luigi De Matthaeis, Valenzano (IT)

(73) Assignee: C.R.F. Societa Consortile per Azioni (IT)

(*) Notice: Subject to any disclaimer, the term of this patent is extended or adjusted under 35 U.S.C. 154(b) by 1114 days.

This patent is subject to a terminal disclaimer.

(21) Appl. No.: 11/357,594

(22) Filed: Feb. 17, 2006

(65) Prior Publication Data

US 2006/0202145 A1 Sep. 14, 2006

(30) Foreign Application Priority Data

Mar. 14, 2005 (EP) .................................... 05425151

(51) Int. Cl.
*F16K 31/02* (2006.01)

(52) U.S. Cl. ........... 251/129.18; 251/129.16; 239/533.2; 335/273

(58) Field of Classification Search ............. 251/129.16, 251/129.18, 129.22; 335/258, 273, 274; 239/533.1–533.12, 584, 585.1–585.5, 96, 239/127; 123/467, 456, 447, 446
See application file for complete search history.

(56) References Cited

U.S. PATENT DOCUMENTS

| | | | | |
|---|---|---|---|---|
| 4,016,965 | A * | 4/1977 | Wirth et al. | 400/124.17 |
| 4,482,094 | A * | 11/1984 | Knape | 239/88 |
| 4,586,656 | A * | 5/1986 | Wich | 239/88 |
| 5,082,180 | A | 1/1992 | Kubo et al. | |
| 5,114,077 | A * | 5/1992 | Cerny | 239/483 |
| 6,131,829 | A | 10/2000 | Ricco | |
| 6,305,355 | B1 * | 10/2001 | Hoffmann et al. | 123/467 |
| 6,443,132 | B1 * | 9/2002 | Ricco et al. | 123/467 |
| 6,688,579 | B2 * | 2/2004 | Grytz | 251/129.16 |
| 6,837,221 | B2 * | 1/2005 | Crofts et al. | 123/467 |
| 2005/0017097 | A1 * | 1/2005 | Hans | 239/585.1 |

(Continued)

FOREIGN PATENT DOCUMENTS

EP 0 890 730 A 1/1999

(Continued)

OTHER PUBLICATIONS

EP15775399translation—English translation of EP1577539.*

(Continued)

*Primary Examiner* — John Fristoe, Jr.
*Assistant Examiner* — Andrew J Rost
(74) *Attorney, Agent, or Firm* — Ostrolenk Faber LLP

(57) ABSTRACT

The metering servovalve (7) includes a valve body (8, 30), a shutter (45), and an electromagnet (15), and is housed inside a casing (2) of the injector (1). The electromagnet (15) activates a movable armature (16) performing a travel defined by a stop member (19) carried by the electromagnet (15), which is fixed inside the casing by a threaded ring nut (40) with the interposition of at least one deformable shim (48). The ring nut (40) is screwed to a predetermined tightening torque to a thread (46) on the casing (2) to elastically deform the shim (48). And the shim (48) is defined by a metal ring with, for example, an L-, C-, S-, Z- or Σ-shaped cross section.

7 Claims, 2 Drawing Sheets

U.S. PATENT DOCUMENTS

| | | | | |
|---|---|---|---|---|
| 2005/0230494 | A1* | 10/2005 | Lucas et al. | 239/88 |
| 2006/0202144 | A1* | 9/2006 | Ricco et al. | 251/129.16 |

FOREIGN PATENT DOCUMENTS

| | | | |
|---|---|---|---|
| EP | 0 916 843 | A | 5/1999 |
| EP | 1 577 539 | A2 | 9/2005 |
| GB | 2 378 985 | | 2/2003 |
| JP | 2-176289 | | 7/1990 |
| JP | 02-176289 | | 7/1990 |
| JP | 11-218061 | | 8/1999 |
| JP | 2003-074438 | | 3/2003 |
| JP | 2003-74438 | | 3/2003 |

OTHER PUBLICATIONS

European Search Report EP 05 42 5151 dated Jul. 28, 2005.

Office Action issued by European Patent Office on Dec. 5, 2006 in connection with corresponding European application No. EP 05 42 5151.

English translation of Japanese Office Action issued on Dec. 16, 2008 in connection with corresponding Japanese application No. 2006-045267.

Japanese Office Action mailed Dec. 16, 2008 in corresponding Japanese Patent Application No. 2006-045267 (English translation).

* cited by examiner

ADJUSTABLE METERING SERVOVALVE FOR A FUEL INJECTOR, AND RELATIVE ADJUSTMENT METHOD

The present invention relates to an adjustable metering servovalve for an internal combustion engine fuel injector, and to the relative adjustment method.

As is known, an injector servovalve normally comprises a control chamber for controlling the injector nozzle control rod. The control chamber has an inlet hole communicating with a pressurized-fuel conduit; and a calibrated fuel outlet or delivery hole normally closed by a shutter. The valve body of the servovalve is normally fixed inside the injector casing, and the shutter is controlled by the armature of an electromagnet.

The travel or lift of the armature determines both the opening and closing speed of response of the servovalve, and should therefore be as short as possible. The same travel also determines the delivery hole fuel flow section, and should therefore be as large as possible, within the range of the control chamber outlet hole section. As such, the travel of the armature and/or shutter must be adjusted accurately. Servovalves are known, in which the shutter is separate from the armature, the travel of which is defined at one end by the armature arresting against the shutter in the closed position closing the delivery hole. In one known servovalve, the armature is guided by a sleeve, one end of which defines the stop arresting the armature towards the electromagnet core. In turn the sleeve is fixed inside a cavity in the casing, in such a position with respect to the valve body as to define the armature travel required to open the delivery hole. Armature travel is adjusted using at least one rigid shim located between the sleeve and the electromagnet core to define the air gap of the armature; and at least another rigid shim located between the sleeve and the valve body to define the armature travel.

The rigid shims are selectable from classes of calibrated modular shims, and, for technical and economic reasons, may vary by an amount not less than the machining tolerance, e.g. 5 microns. Adjusting armature travel by discrete quantities with a 5 micron tolerance, however, is relatively inaccurate, to the extent of often failing to keep flow of the injector within the strict range demanded by modern internal combustion engines. Adjustment is therefore a complicated job, involving various trial and error attempts, each of which involves disassembling and reassembling part of the injector. In any case, adjustment on one hand requires a long time work of a skilled operator, on the other hand labour involved, it is frequently unsatisfactory on account of the discrete quantity referred to above.

EP-A-0 890 730 proposes a servovalve, in which the armature guide sleeve has a relatively bendable flange, and a thread for assembly inside the casing cavity independently of the valve body. The flange position is adjusted discretely using shims within a given range, e.g. of five microns. The flange is subsequently deformed for fine adjustment by screwing the sleeve to a calibrated tightening torque.

In known servovalves of the type described above, the shutter is subjected, on the one hand, to axial thrust exerted by the fuel pressure in the control chamber, and, on the other, to the axial thrust of a spring preloaded to overcome the thrust of the fuel pressure when the electromagnet is deenergized. The spring is therefore designed and sized to exert considerable axial thrust, e.g. of around 70 newtons for 1800 bar fuel pressure. When the electromagnet is energized, the armature is moved and arrested against a fixed member, in such a position as to permit a minimum residual air gap with respect to the electromagnet core, to optimize the speed of response of the servovalve when the electromagnet is deenergized.

To reduce the preload of the spring closing the shutter, a servovalve has recently been proposed in which, as opposed to exerting axial thrust, the pressurized fuel acts radially on the shutter support, so that fuel pressure action on the shutter is substantially balanced, and the action of the spring and the electromagnet may therefore be reduced. Moreover, since the risk of the armature seizing is negligible, the armature may be arrested directly on the electromagnet core, thus eliminating the residual air gap with respect to the core. In this known servovalve, however, travel of the shutter is adjusted using rigid shims, and is therefore adjustable by discrete amounts roughly equal to the machining tolerance, i.e. 5 microns.

The object of the invention is to provide an adjustable metering servovalve and relative adjustment method, which are highly reliable, are cheap to implement, and provide for eliminating the drawbacks of known fuel metering servovalves and the known adjustment method.

According to the invention, there is provided an adjustable metering servovalve, as claimed in claim 1.

According to the invention, there is also provided a method of adjusting travel of the shutter.

Two preferred, non-limiting embodiments of the invention will be described by way of example with reference to the accompanying drawings, in which.

Figure 1:
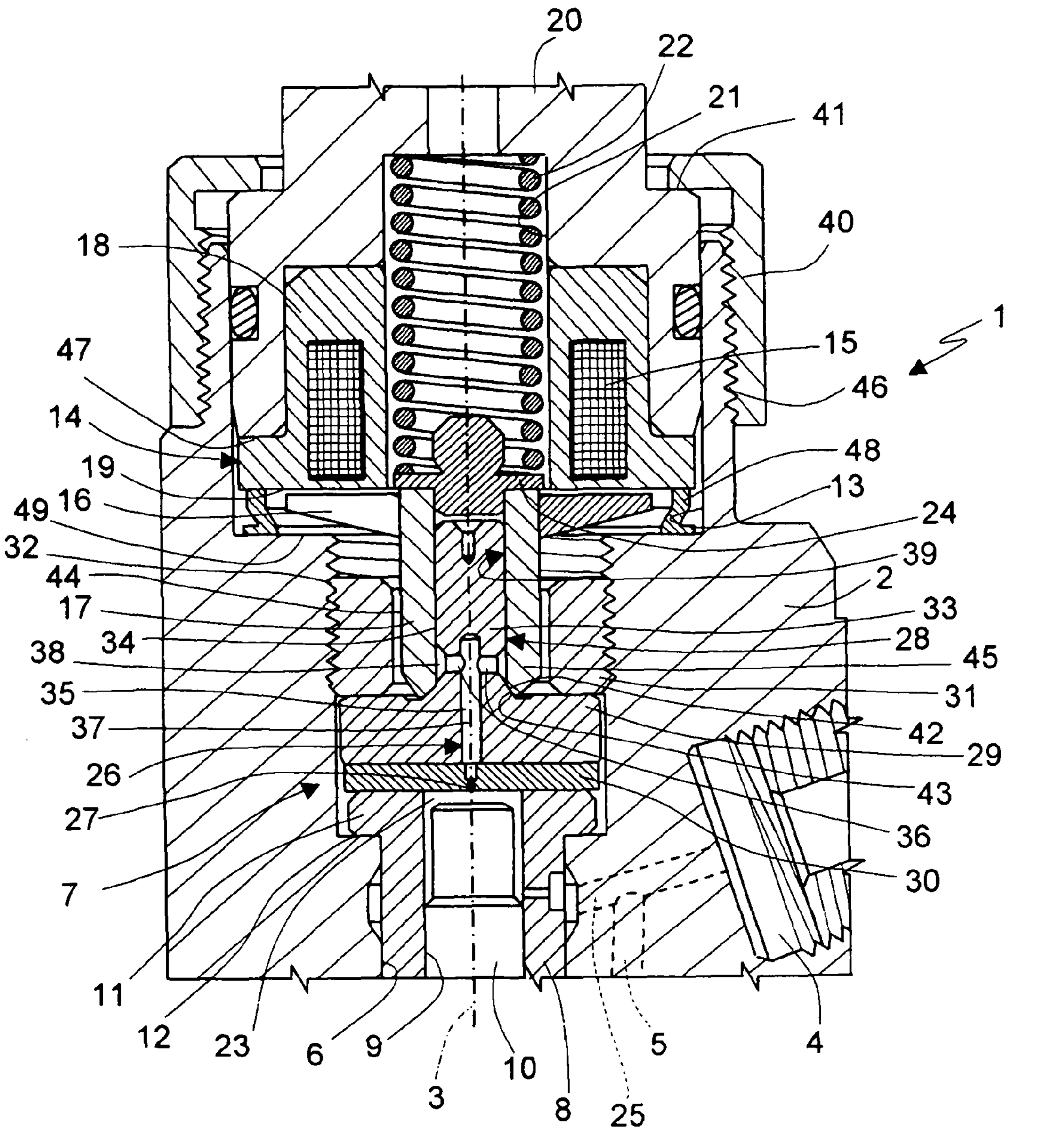
FIG. 1 shows a partial section of a fuel injector featuring an adjustable metering servovalve in accordance with a first embodiment of the invention.

Number 1 in FIG. 1 indicates as a whole a fuel injector (shown partly) of an internal combustion engine, in particular a diesel engine. Injector 1 comprises a hollow body or casing 2 extending along a longitudinal axis 3, and having a lateral inlet 4 connectable to a high-pressure, e.g. roughly 1800 bar, fuel supply conduit. Casing 2 terminates with a nozzle (not shown) communicating with inlet 4 along a conduit 5, and adapted to inject fuel into a relative engine cylinder.

Casing 2 defines an axial cavity 6 housing a metering servovalve 7 comprising a valve body 8. Body 8 has an axial hole 9, in which a control rod 10 slides axially in fluidtight manner; and a flange 11 normally resting on a shoulder 12 of cavity 6. Control rod 10 is adapted to control a pin shutter (not shown) in known manner to close and open the fuel injection nozzle.

Casing 2 also has another cavity 13 coaxial with axis 3 and housing an actuating device 14, which comprises an electromagnet 15 for controlling a slotted-disk-type armature 16 integral with a sleeve 17. Electromagnet 15 comprises a magnetic core 18 having a pole surface 19 perpendicular to axis 3, and is held in position by a support 20 as explained in detail below.

Magnetic core 18 has a cavity 21 coaxial with axis 3 and housing a helical compression spring 22 preloaded to exert thrust on armature 16 in the opposite direction to the attraction exerted by electromagnet 15. More specifically, spring 22 has one end resting on support 20, and the other end acting on armature 16 via a washer 24 comprising a guide block for guiding the end of spring 22.

Servovalve 7 comprises a control chamber 23 communicating permanently with inlet 4 via a passage 25 to receive pressurized fuel. Control chamber 23 is bounded axially at one end by rod 10, and at the other by a bottom disk 30 contacting flange 11 of body 8, and has a fuel outlet or drain passage, indicated as a whole by 26, which is symmetrical with respect to axis 3 and comprises a calibrated-section delivery hole 27 formed in disk 30 along axis 3. Outlet passage 26 also comprises a distribution portion 35 formed in a guide body 28 for guiding armature 16 and located in an intermediate axial position between disk 30 and actuating device 14.

Body 28 comprises a base 29 gripped axially by a threaded ring nut 31 screwed to an internal thread 32 of casing 2. More specifically, base 29 of body 28 is housed in fluidtight manner inside cavity 6, and is packed in a fixed position with disk 30 and flange 11, which rests axially on shoulder 12. Body 28 comprises a pin or rod 33 projecting from base 29 along axis 3, in the opposite direction to chamber 23, and bounded externally by a cylindrical lateral surface 34 for axially guiding sleeve 17 of armature 16.

Rod 33 is formed in one piece with base 29, and has two diametrically opposite radial holes 36 communicating with an axial portion 37 of distribution portion 35 of passage 26, and therefore communicating in fluidtight manner with calibrated delivery hole 27. Holes 36 come out of rod 33 at an axial location adjacent to base 29 and where an annular chamber 38 is formed along lateral surface 34 of rod 33. Sleeve 17 has a cylindrical inner surface 39 fitted in substantially fluidtight manner to lateral surface 34 with a calibrated diametrical clearance, e.g. of less than 4 microns, or via the interposition of sealing members.

Sleeve 17 slides axially along surface 34 between a forward limit position and a withdrawn limit position. The forward limit position closes passage 26, and is defined by an end 42 of sleeve 17 arresting against a conical shoulder 43 of body 28; and the withdrawn limit position opens radial holes 36 of passage 26 completely, and is defined by armature 16 arresting against polar surface 19 of core 18.

More specifically, in the forward limit position, the fuel exerts zero resultant axial thrust on sleeve 17, by virtue of the pressure in chamber 23 acting radially on surface 34; whereas, in the withdrawn limit position, fuel flows from radial holes 36 into a drain or recirculating channel (not shown) through an annular passage 44 between ring nut 31 and sleeve 17, through the slots in armature 16, through cavity 21 in the core, and through an opening in support 20.

Annular chamber 38 is opened and closed by a shutter 45 defined by a bottom portion of sleeve 17 adjacent to end 42. Shutter 45 is therefore activated together with armature 16 by energizing electromagnet 15. More specifically, armature 16 moves towards core 18 to open servovalve 7 and drain the fuel, thus causing a fall in fuel pressure in control chamber 23, so that rod 10 translates axially to open and close the injection nozzle. When electromagnet 15 is deenergized, spring 22 restores armature 16 to the FIG. 1 position, so that shutter 45 closes passage 26 and therefore servovalve 7.

To determine the travel of shutter 45, one of the two stop members 19, 43 is fixed inside casing 2 with the interposition of at least one shim. More specifically, core 18 of electromagnet 15 is fixed inside cavity 13 of casing 2 by means of a threaded ring nut 40 engaging an annular shoulder 41 of support 20. The lateral surface of support 20 is housed in fluidtight manner inside cavity 13, while the bottom end of support 20 engages an annular shoulder 47 of core 18.

Ring nut 40 is screwed to an external thread 46 of casing 2 to a tightening torque ensuring the desired axial position of core 18. Which axial position is defined by at least one shim comprising a ring 48 of appropriate thickness and located between polar surface 19 of core 18 and a shoulder 49 of cavity 13 of casing 2.

According to the invention, shim 48 is defined by an annular member, which is elastically bendable or compressible, but of adequate stiffness. Ring nut 40 is designed to screw to a tightening torque ranging, for example, between 15 and 25 N·m. The shim 48 is such that, with a tightening torque within the above range, a corresponding axial tightening load is produced ensuring an elastic variation of 10 to 15 microns in the thickness or height of shim 48.

Figure 3:
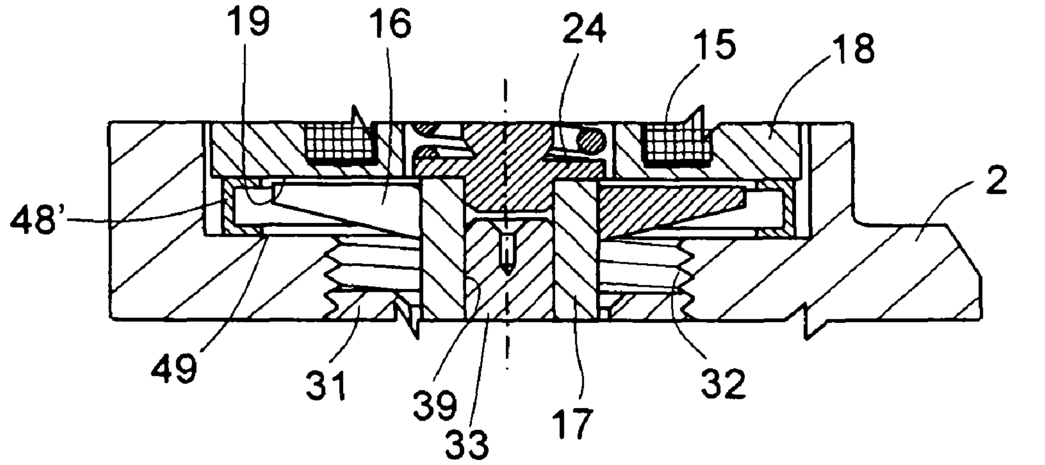
FIG. 3 shows a larger-scale detail of a variation of the FIG. 1 servovalve.

According to FIG. 1 embodiment, shim 48 is made of metal, has an L-shaped cross section with at least one portion of the vertical branch of the L inclined, and is deformed elastically predominantly by bending at the join between the two branches of the L, so that the bottom branch of the L remains parallel to shoulder 49. In the FIG. 3 embodiment, shim 48' has a C-shaped cross section, and is therefore deformed elastically substantially by compression of the vertical branch of the C. Which compression acts on the vertical branch in the form of combined bending and compressive stress, and therefore also produces a certain amount of bending between the two horizontal branches of the C.

Figure 2:
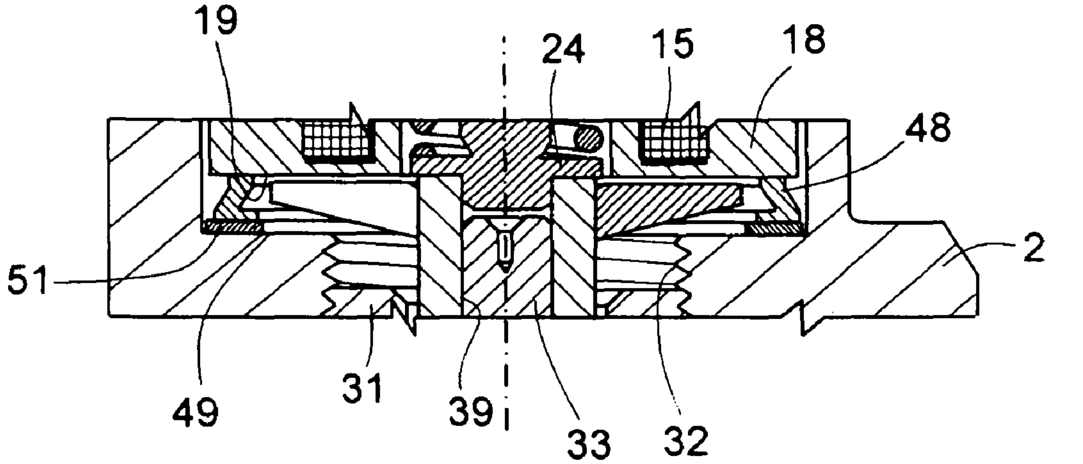
FIG. 2 shows a larger-scale detail of a further embodiment of the servovalve.

In practice, since the variation in the thickness of the shim is always relatively small, it may be useful to provide a stock of elastic shims of modular dimensions, i.e. of different thickness classes. In both the FIGS. 1 and 3 embodiments, one shim 48, 48' may advantageously be combined with one or more rigid shims 51, as shown in the FIG. 2 variation of the FIG. 1 embodiment. Rigid shims 51 may be calibrated and of modular dimensions, and may be selected to minimize deformation of the deformable shim 48, 48'.

The travel of shutter 45 of servovalve 7, i.e. the lift of armature 16, may be adjusted by controlling a dimensional parameter, e.g. the distance between polar surface 19 and shoulder 49, or an operating parameter, e.g. the drain flow of servovalve 7, or the opening speed of servovalve 7 and therefore the flow of injector 1.

More specifically, when assembling injector 1, shims 48 and 51 or 48' and 51 are selected to first defines a lift of armature 16 which, with a minimum tightening torque, is slightly smaller than the desired lift. The minimum tightening torque may, for example, be 15 N·m, and at any rate is such as to ensure sufficient friction to prevent loosening of ring nut 40 by thermal and mechanical stress produced by the engine. The resulting lift may, for example, be 2 to 12 microns more than the desired lift.

The lift with the minimum tightening torque is then measured using a feeler gauge, while, using a preferably automatic torque wrench, the tightening torque of ring nut 40, and therefore deformation of shim 48, 48', is increased until the feeler gauge reading shows the desired lift. Should the tightening torque reach a predetermined maximum value, e.g. 25 N·m, without achieving the desired lift, injector 1 must be rejected or reopened to fit preliminary shims 48, 48' and/or 51 of suitable dimensions.

Alternatively, preliminary shims 48, 48' and/or 51 may be selected of such a size as to produce slightly more than the desired lift with the maximum tightening torque of 25 N·m. Once the injector is assembled, ring nut 40 is loosened, in the same way as described before, to reduce deformation of shim 48, 48' until the feeler gauge reading shows the desired lift. Obviously, should the minimum tightening torque of 15 N·m be reached without achieving the desired lift, the same steps are taken as described above.

Whichever the case, once the lift of armature 16 is adjusted, ring nut 40 may be locked, e.g. electrically spot welded, to casing 2 to ensure against ring nut 40 working loose, even by a minimum amount.

As an alternative to the above method using a feeler gauge, travel of armature 16 may be adjusted using a method based on another parameter, such as the amount of fuel injected by injector 1 at one or more reference points; in which case, the result is corrected under the control of a feedback control unit and by acting on the tightening torque of ring nut 40.

In both cases, adjustment is therefore made by inserting inside cavity 13 at least one deformable shim 48, 48' together with one or more rigid shims 51, so that, with a predetermined tightening torque of ring nut 40, the value of the selected parameter is greater or less than the desired value. Subsequently, a fine adjustment is made by successive approximations, e.g. by turning ring nut 40 each time by a predetermined angle: in the first case to increase and in the second case to reduce the axial load. After each turn of the ring nut, the corresponding parameter value is measured until a minimum difference is achieved with respect to the desired parameter value. In this way, the travel of shutter 45 can be adjusted to a tolerance of one micron.

Because of the machining tolerance of the component parts of servovalve 7, the same travel of shutters 45 of different servovalves 7 may give different fuel flow values. To adjust servovalve 7 more accurately, according to the invention, a first adjustment can be made based on determining the distance between polar surface 19 of core 18 and shoulder 43 of body 28 or shoulder 49 of casing 2. Subsequently, with injector 1 operating in the injection system, a fine adjustment can then be made based on determining the instantaneous flow of injector 1.

The advantages, as compared with known technology, of the adjustable metering servovalve and relative fine adjustment method according to the present invention will be clear from the foregoing description. In particular, the travel of armature 16 is adjustable continuously and therefore more accurately; the need for different shim classes is minimized or even eliminated; high-precision machining of the shims and other parts determining lift of the armature, such as the casing, the magnetic core, and the servovalve 7 assembly, is also reduced; the need for electronic control unit software to compensate for any difference between the injectors is also eliminated; and, finally, by virtue of shutter 45 being balanced, on the one hand, armature 16 may be arrested directly on polar surface 19, and, on the other, the axial load required on deformable shim 48, 48' to achieve the desired dimensional variations is reduced.

Clearly, changes may be made to the metering servovalve and relative adjustment method as described herein without, however, departing from the scope of the accompanying Claims.

For example, the shim may have a cross section other than those described and illustrated, and in particular any cross section having a portion which is easily and controllably deformable elastically and preferably predominantly bendable, such as an S-, Z- or Σ-shaped cross section. Moreover, end disk 30 of valve body 8 may be formed in one piece with valve body 8; armature 16 may have a thin layer of nonmagnetic material acting as an air gap; and actuator 14 may be a different type, e.g. piezoelectric.

The invention claimed is:

1. An adjustable metering servovalve and an internal combustion engine fuel injector, said fuel injector comprising:

a control rod configured to be movable to control a pin shutter configured to close and open a fuel injection nozzle;

the servovalve being housed in a casing of said fuel injector and comprising:

a valve body;

a control chamber which permanently communicates with an inlet via a passage to receive pressurized fuel and which is bounded axially at an end thereof by the control rod; the control chamber communicating with a draining passage;

a shutter sliding along an axis between a forward position and a withdrawn position, where said shutter is defined by a sleeve integral with an armature; said sleeve sliding on a rod having at least one radial hole of the draining passage;

an actuator for controlling said shutter, the actuator comprising:

a) an electromagnet comprising a magnetic core having a polar surface perpendicular to said axis; and b) said armature performing a given travel defined by a pair of opposite stop members; one of said stop members being formed by said polar surface and being fixed inside said casing by a threaded member with the interposition of at least one shim;

a support which holds in position said electromagnet; said threaded member being a threaded ring nut, which engages an annular shoulder of said support and is screwed with a predetermined tightening torque to a thread of said casing to fix said electromagnet inside said casing and to produce a corresponding tightening load on said shim; the bottom end of said support engaging an annular shoulder of said magnetic core; and said shim being located between said polar surface and a shoulder of a cavity of said casing and being deformable elastically by said threaded ring nut, as a function of said tightening torque, so as to adjust the travel of said armature, wherein said shim is defined by a ring made of elastically deformable material and wherein said ring has a cross section such that the ring is predominantly bendable.

2. A servovalve as claimed in claim 1 wherein said bendable ring has a cross section selected from a group comprising an L-shaped cross section, C-shaped cross section, S-shaped cross section, Z-shaped cross section, and Σ-shaped cross section.

3. A servovalve as claimed in claim 1, wherein said rod is carried by a guide body having a conical shoulder forming one of said opposite stop members; said sleeve having one end which is arrested against said conical shoulder.

4. A servovalve as claimed in claim 1, wherein said magnetic core is fixed inside said casing by a number of calibrated shims of modular dimensions; at least one of said shims being deformable elastically and at least one of said shims may be a rigid calibrated shim of modular dimensions.

5. A method of adjusting a metering servovalve as claimed in claim 4, comprising the following steps:

providing the electromagnet having the magnetic core with a polar surface as being adapted to stop the travel of the armature controlling said shutter;

providing the deformable shim as a ring having a cross section such as to be predominantly bendable upon an axial tightening load for adjusting said travel;

providing a number of calibrated modular shims and selecting a rigid shim from said number to make, together with said deformable ring, a preliminary adjustment of said polar surface;

establishing a given value of a parameter indicating the travel of said armature;

setting said core to an approximate value corresponding said preliminary adjustment greater or less than the parameter value corresponding to the adjusted travel of said armature; and making a fine adjustment of said core by successive approximations from said preliminary adjustment to said parameter value.

6. The adjustable metering servovalve and an internal combustion engine fuel injector of claim 1, wherein the drain passage comprises a distribution portion formed in a guide body for guiding the armature, with said guide body comprising a base gripped by the casing with a rod extending from the base in a direction away from the control chamber, the guide body being positioned for axially guiding the sleeve of the armature.

7. The adjustable metering servovalve and an internal combustion engine fuel injector of claim 1, wherein the ring has a cylindrical configuration with a cross section having an outwardly extending bend to enable the ring to be predominantly bendable.

* * * * *